US010078864B2

(12) United States Patent
Liu et al.

(10) Patent No.: US 10,078,864 B2
(45) Date of Patent: Sep. 18, 2018

(54) IDENTIFYING SOLD INDICATORS IN SOCIAL NETWORKING SYSTEM LISTINGS

(71) Applicant: Facebook, Inc., Menlo Park, CA (US)

(72) Inventors: Deborah Liu, Palo Alto, CA (US);
Mary Pao-an Ku, San Jose, CA (US);
Kwok Ngai Eric Lo, Issaquah, WA (US); Bowen Pan, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 380 days.

(21) Appl. No.: 14/693,391

(22) Filed: Apr. 22, 2015

(65) Prior Publication Data
US 2016/0314519 A1    Oct. 27, 2016

(51) Int. Cl.
*G06Q 30/06* (2012.01)
*G06Q 50/00* (2012.01)

(52) U.S. Cl.
CPC ..... *G06Q 30/0641* (2013.01); *G06Q 30/0627* (2013.01); *G06Q 50/01* (2013.01)

(58) Field of Classification Search
CPC .... G06Q 50/01; G06Q 30/06; G06Q 30/0623; G06Q 30/0627
See application file for complete search history.

(56) References Cited

U.S. PATENT DOCUMENTS

| | | | | |
|---|---|---|---|---|
| 2007/0220565 A1* | 9/2007 | Angel | ............... | G06Q 10/087 725/87 |
| 2012/0215584 A1* | 8/2012 | Narsude | ............... | G06Q 20/202 705/7.29 |
| 2015/0199772 A1* | 7/2015 | Sherman | ............ | G06Q 30/0643 705/319 |
| 2015/0332362 A1* | 11/2015 | Kalt | ................... | G06Q 30/0611 705/26.4 |

OTHER PUBLICATIONS

Resnick P, Zeckhauser R, (2002), Trust among strangers in internet transactions: Empirical analysis of eBay's reputation system, in Michael R. Baye (ed.) The Economics of the Internet and E-commerce (Advances in Applied Microeconomics, vol. 11) Emerald Group Publishing Limited, pp. 127-157 (Year: 2002).*

Resnick P, Zeckhauser R, (2002), Trust among strangers in Internet transactions: Empirical analysis of eBay's reputation system, in Michael R. Baye (ed.) The Economics of the Internet and E-commerce (Advances in Applied Microeconomics, vol. 11) Emeraid Group Publishing Limited, pp. 127-157 (Year: 2002).*

\* cited by examiner

Primary Examiner — Michael Misiaszek
Assistant Examiner — Matthew W Todd
(74) Attorney, Agent, or Firm — Keller Jolley Preece

(57) ABSTRACT

The present disclosure is directed toward systems and methods for identifying sold indicators within for-sale groups hosted by a social networking system. For example, systems and methods described herein identify information and social networking activities associated with a sale listing to determine whether an item advertised by the sale listing has been sold. Furthermore, systems and methods can prompt a seller associated with the sale listing to take action with regard to the sale listing in response to a determination that the item advertised by the sale listing has been sold.

20 Claims, 9 Drawing Sheets

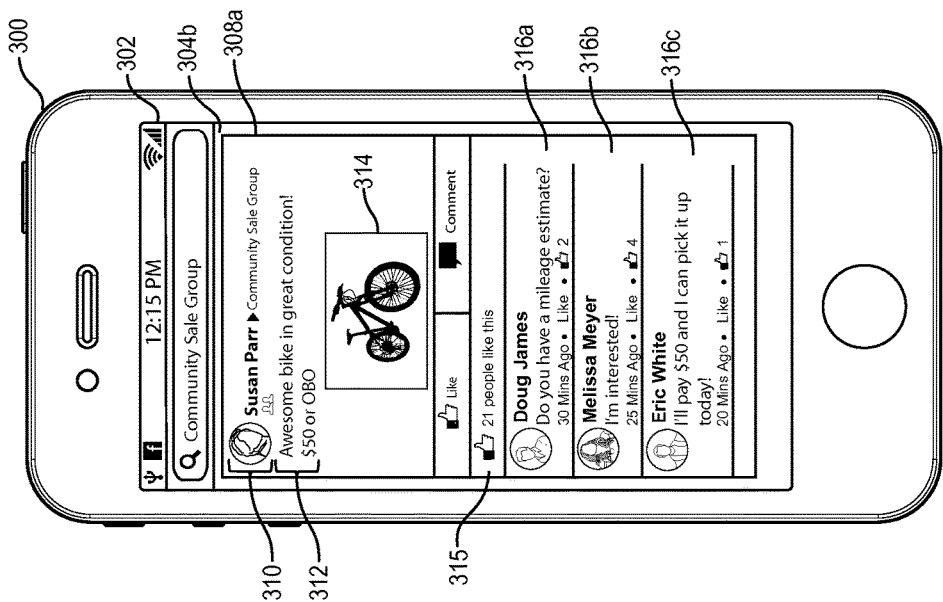
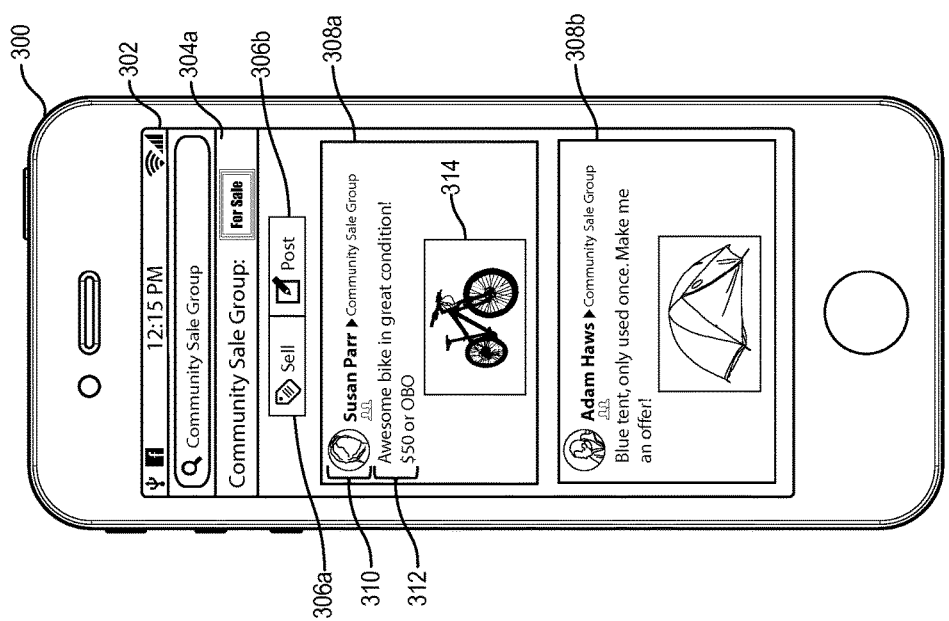
Fig. 3B
Fig. 3A

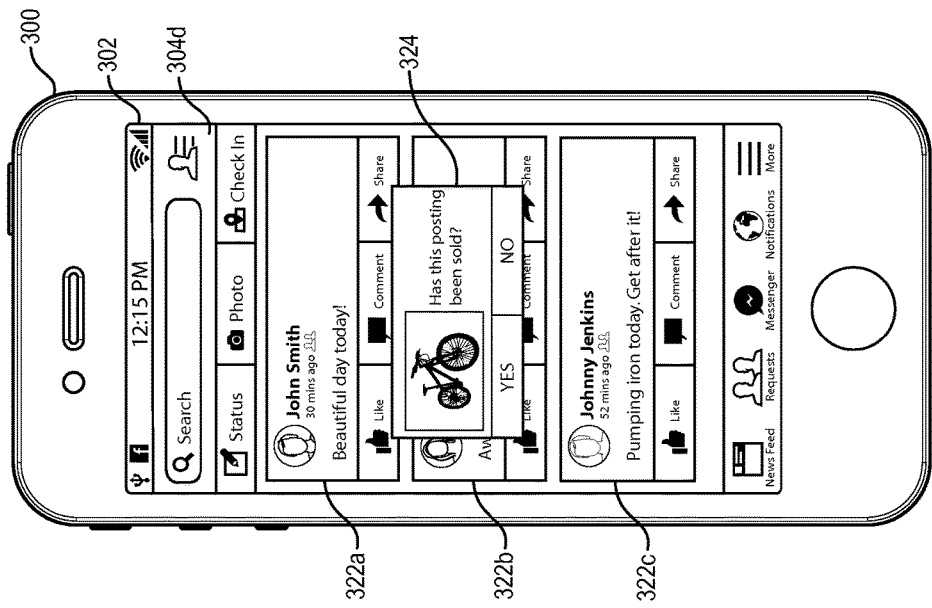
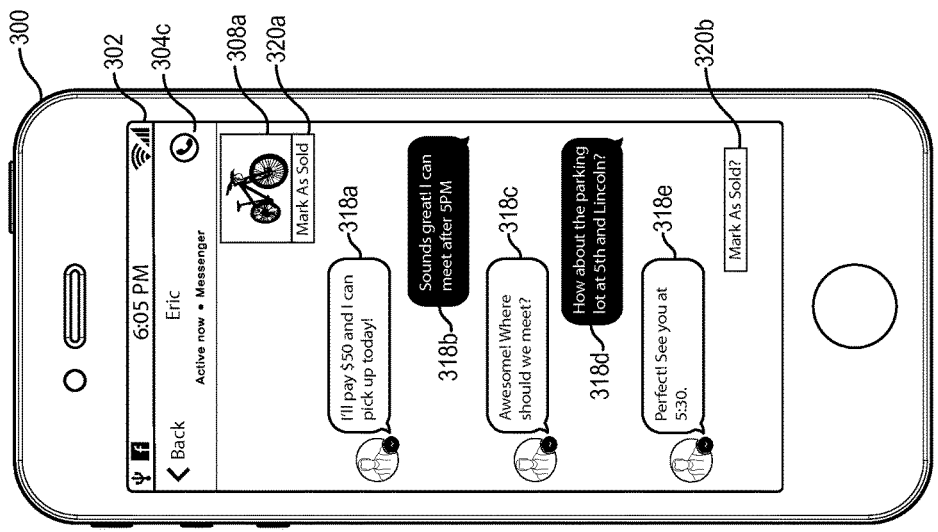
Fig. 3D
Fig. 3C

IDENTIFYING SOLD INDICATORS IN SOCIAL NETWORKING SYSTEM LISTINGS

CROSS REFERENCE TO RELATED APPLICATIONS

N/A

BACKGROUND

1. Technical Field

One or more embodiments of the present disclosure relate generally to social networking system for-sale groups and activities. More specifically, one or more embodiments of the present disclosure relate to managing social networking system for-sale posts/listings.

2. Background and Relevant Art

People often buy and sell goods in non-commercial settings. For example, garage sales, yard sales, and estate sales provide a setting where people can negotiate the sale and purchase of wide ranges of goods. These informal, non-commercial settings embody the notion that "one man's trash is another man's treasure," and provide people with easy ways to get rid of things they no longer want, or purchase things they need for less than they would typically spend in a commercial setting.

It is not surprising that the garage sale format of buying and selling goods has transitioned online via websites, social networking systems, and other online forums. With respect to social networking systems, a social networking system generally allows for the formation of groups that are typically dedicated to a particular purpose. Social networking system users can join a social networking system group to participate in discussions, ask questions, post articles, etc. A social networking system "for-sale" group typically functions like a neighborhood garage sale and allows users to submit sale listings that advertise goods they would like to sell and/or buy. Users can view the listings in a for-sale group and utilize features of the social networking system to comment on a particular listing or send a message to the seller associated with the particular listing in order to negotiate a price, make a purchase, arrange for a pick up, etc.

Even though social networking system for-sale groups provide a widely available and non-commercial forum for buying and selling goods, the nature of for-sale groups leads to inefficiencies for sellers and potential purchasers. For example, even though the seller may eventually sell the item, there are no efficient mechanisms for a seller for-sale listing to mark items as having been sold. This is a problem that is not as prominent, for example, in a typical yard sale where the sale of an item is readily apparent because the item is no longer physically present. As such, this problem is unique to and/or magnified by virtual for-sale listings available via, for example, a social networking system. Generally, in response to the sale of a particular item, the seller's only option is to remove the for-sale listing advertising the now-sold item. Removing the listing, however, may be an undesirable solution for the seller, as the seller may want to establish himself as a regular seller of a particular type of item. For this reason, the seller may wish to create a public record of listings illustrating the seller's past sales of the particular item from which potential purchasers can infer any information related to the seller (i.e., the seller's promptness in delivery, the quality of the items sold by the seller, etc.).

Additionally, sellers who do not care to keep past-listings displayed within the for-sale group often forget to remove listings advertising now-sold items. For example, a seller and a purchaser may utilize a social networking system for-sale group to facilitate the sale of a particular item. The actual purchase transaction between the seller and the purchaser typically takes place off-line. Once the seller sells the item, the seller may no longer have any reason to think about the original for-sale listing for the item and may forget to update the listing to indicate that the item is no longer available. Accordingly, another for-sale group member may later attempt to contact a seller to purchase the item that the seller has already sold to someone else. As such, potential purchasers risk wasting time and effort pursuing items listed in for-sale groups that are no longer available.

Thus, there are several disadvantages to current methods for managing for-sale groups and activities within a social networking system.

SUMMARY

One or more embodiments described herein provide benefits and/or solve one or more of the foregoing or other problems in the art with systems and methods for managing for-sale groups and activities within a social networking system. One or more embodiments described herein include systems and methods for identifying indications that a for-sale item as been sold ("sold indicators") within social networking system for-sale groups by determining when a seller has likely sold an advertised item based on information associated with the for-sale item. In response to determining that a seller has likely sold a particular item advertised in a for-sale listing, systems and methods described herein can prompt the seller to mark the advertised item as no longer being available for purchase and the social networking system can update the listing and notify other users accordingly.

For example, in one or more embodiments, systems and methods described herein can analyze information related to an item advertised within a for-sale listing. Additionally, systems and methods described herein can analyze social networking system activity connected to a particular listing advertising an item for sale. In response to social networking activities that indicate the seller has likely sold the advertised item (e.g., as part of an offline transaction), the disclosed systems and methods can prompt the seller to mark the item as sold. Once the seller has marked the item as sold, the disclosed systems and methods can update the listing to indicate that the item is no longer available.

Additional features and advantages of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which:

FIG. 3A-3E illustrate user interfaces for utilizing the for-sale group system in accordance with one or more embodiments;

DETAILED DESCRIPTION

Figure 1:
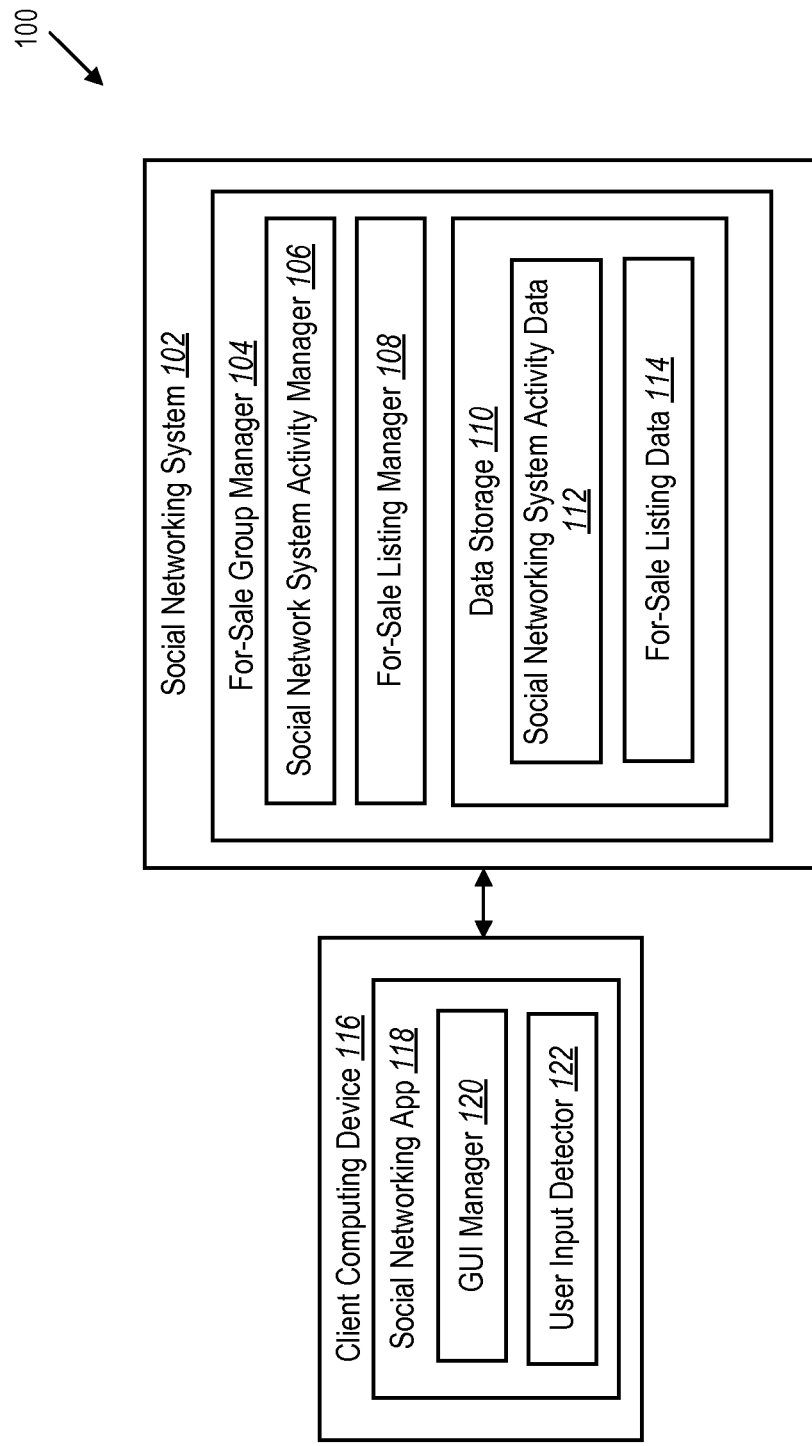
FIG. 1 illustrates a detailed schematic diagram of a for-sale group system in accordance with one or more embodiments.

One or more embodiments described herein provide benefits and/or solve one or more of the foregoing or other problems in the art with systems and methods for managing for-sale groups and activities within a social networking system. In particular, the present disclosure provides methods and systems for identifying sold indicators for sale listings within a social networking system. For example, a for-sale group system of one or more embodiments described herein can analyze information and social networking system activities connected to a particular for-sale listing in order to determine a likelihood that the seller has sold the item advertised within the listing. In one or more embodiments, the for-sale group system can detect certain language and other activities associated with a listing that are indicative of an off-line sale.

Once the for-sale group system identifies a listing featuring an item that is likely no longer available, the for-sale group system can prompt the item seller to update the listing. For example, the for-sale group system can provide the item seller with a reminder notification inquiring as to the status of the featured item. Additionally, the for-sale group system can prompt the item seller to update the listing to indicate that the advertised item is no longer for sale. In at least one embodiment, the for-sale group system can also provide a mechanism by which the item seller can mark the item as sold within one or more for-sale groups with a single action, such as the simple click of a button.

For example, as mentioned above, while social networking system for-sale groups provide buyers and sellers with a means to advertise sale items and make purchase arrangements, the actual purchase transaction (i.e., the buyer giving the seller money, and the seller giving the buyer the item), typically occurs off-line "in the real world." For this reason, the for-sale group system described herein can analyze information related to a sale listing within a for-sale group to determine whether or not an off-line transaction related to the sale listing has taken place, even though the sale listing may still appear to be active. As used herein, an "active" sale listing is one where the item advertised by the sale listing has not yet been sold.

In one or more embodiments, the for-sale group system can analyze information related to the item advertised in a sale listing to determine an average amount of time within which similar items are typically sold. When that average amount of time elapses, the for-sale group system can analyze social networking system activity information related to the sale listing, the seller, and one or more potential purchasers to determine a likelihood as to whether an off-line sale of the item advertised by the sale listing has taken place. If an off-line sale of the item has likely taken place, the for-sale group system can prompt the seller associated with the sale listing to update the sale listing to indicate that the item advertised therein is no longer available.

As used herein, the term "social networking system" refers to a system that supports and enables on-line communication, input, interaction, content-sharing, and collaboration between users. A user of the social networking system can have one or more "friends" via the social networking system. As used herein, the term "friend" refers to a co-user associated with a user via the social networking system (i.e., a contact or connection). Furthermore, as used herein, a "for-sale group" is a group within the social networking system where users (who may or may not be friends) can submit listings (e.g., posts) that advertise items that are for sale. By utilizing the functionality of the social networking system (i.e., via comments, messages, "likes," etc.), purchasers and sellers can coordinate the purchase and sale of items through for-sale groups. For-sale groups may or may not require participants to become group members before viewing and/or submitting sale listings.

Also as used herein, a "sale listing" or "for-sale listing" refers to social networking system post composed by an item seller that advertises the item for sale. A sale listing can include information that the social networking system displays within a for-sale group, such as, but not limited to a picture of the item, a description of the item, the social networking system identity of the seller, etc. The sale listing can also include and/or be associated with structured data that is part of the listing, even though the social networking system may not display the structured data within a for-sale group. As used herein, "structured data" can include metadata associated with node and edge information related to the listing, information related to the seller, information related to the item featured in the listing, and interaction information related to the sale listing within the for-sale group.

FIG. 1 illustrates a schematic diagram illustrating an example embodiment of a for-sale group system 100 (or simply "system 100"). As shown in FIG. 1, the system 100 may include various components and/or subsystems for performing the processes and features described herein. For example, as shown in FIG. 1, the system 100 may include, but is not limited to, a social networking system 102 including a for-sale group manager 104, and one or more client computing device(s) 116. The for-sale group manager 104 can include, but is not limited to, a social networking system activity manager 106, a for-sale listing manager 108, and a data storage 110, which includes social networking system activity data 112 and for-sale listing data 114. The client computing device 116 can include a social networking application 118, which includes a graphical user interface manager 120 and an input detector 122.

The social networking system 102, each of the components 106-114 of the for-sale group manager 104, and each of the components 120-122 of the social networking application 118 can be implemented using a computing device including at least one processor executing instructions that cause the system 100 to perform the processes described herein. In some embodiments, the components 102-122 can all be implemented by a single server device, or across multiple server devices. Additionally or alternatively, a combination of one or more server devices and one or more client devices can implement the components 102-122. Furthermore, in one embodiment, the components 102-122 can comprise hardware, such as a special-purpose processing device to perform a certain function. Additionally or alternatively, the components 102-122 can comprise a combination of computer-executable instructions and hardware.

In one or more embodiments, the social networking application 118 can be a native application installed on the client computing device 116. For example, the social networking application 118 may be a mobile application that installs and runs on a mobile device, such as a smart phone or a tablet. Alternatively, the social networking application 118 can be a desktop application, widget, or other form of a native computer program. Alternatively, the social networking application 118 may be a remote application accessed by the client computing device 116. For example, the social networking application 118 may be a web application that is executed within a web browser of the client computing device 116.

As mentioned above, and as shown in FIG. 1, the social networking application 118 can include a graphical user interface (or simply "GUI") manager 120. The GUI manager 120 can provide, manage, and/or control a graphical user interface (or simply "user interface") that allows a user to compose, view, and submit for-sale listings, as well as other social networking system posts and messages. For example, the GUI manager 120 can provide a user interface that facilitates the display of a for-sale group containing one or more item listings. Likewise, the GUI manager 120 can provide a user interface that facilitates the display of a social network system user's newsfeed or wall. Similarly, the GUI manager 120 can provide a user interface that displays one or more electronic messages received by a social network system user.

More specifically, the GUI manager 120 can facilitate the display of a user interface (e.g., by way of a display device associated with the client computing device 116). For example, the GUI manager 120 may compose the user interface of a plurality of graphical components, objects, and/or elements that allow a user to compose, send, and receive electronic messages, social networking system posts, and/or for-sale listings. More particularly, the GUI manager 120 may direct the client computing device 116 to display a group of graphical components, objects, and/or elements that enable a user to view electronic messages, social networking system posts, and/or for-sale listings.

In addition, the GUI manager 120 may direct the client computing device 116 to display one or more graphical objects, controls, or elements that facilitate user input for composing, sending, and/or submitting a social networking system post, electronic message, and/or for-sale listing. To illustrate, the GUI manager 120 may provide a user interface that allows a user to provide user input to the social networking application 118. For example, the GUI manager 120 can provide one or more user interfaces that allow a user to input one or more types of content into a social networking system post, an electronic message, or a for-sale listing. As used herein, "content" refers to any data or information to be included as part of a social networking system post, message, or listing. For example, the term "content" will be used herein to generally describe text, images, digital media, files, location information, payment information, or any other data that can be included as part of a social networking system post, electronic message, or for-sale listing.

The GUI manager 120 can also facilitate the input of text or other data to be included in a social networking system post, electronic message, or for-sale listing. For example, the GUI manager 120 can provide a user interface that includes a touch display keyboard. A user can interact with the touch display keyboard using one or more touch gestures to input text to be included in a social networking system post, electronic message, or for-sale listing. For example, a user can user the touch display keyboard to enter a description of an item in a for-sale listing. In addition to text, the user interface, including the touch display keyboard, can facilitate the input of various other characters, symbols, icons, or other information.

Furthermore, the GUI manager 120 can provide and transition between two or more graphical user interfaces. For example, in one embodiment, the GUI manager 120 can provide a newsfeed to a social networking system user containing one or more social networking system posts from co-users associated with the user via the social networking system. Later, in response to detected input from the user or the for-sale group manager 104, the GUI manager 120 can transition to a second graphical user interface that includes the listings within, for example, a particular for-sale group.

As further illustrated in FIG. 1, the social networking application 118 can include a user input detector 122. In one or more embodiments, the user input detector 122 can detect, receive, and/or facilitate user input in any suitable manner. In some examples, the user input detector 122 can detect one or more user interactions with respect to the user interface. As referred to herein, in one context, a "user interaction" may refer to a single interaction, or combination of interactions, received from a user by way of one or more input devices. In another context, a "user interaction" may refer to an interaction by a user with the social networking system 102, content provided by the social networking system 102, or with another user of the social networking system 102.

For example, user input detector 122 can detect a user interaction from a keyboard, mouse, touch page, touch screen, and/or any other input device. In the event the client computing device 116 includes a touch screen, the user input detector 122 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 122 may additionally, or alternatively, receive data representative of a user interaction. For example, user input detector 122 may receive one or more user configurable parameters from a user, one or more user commands from the user, and/or any other suitable user input. The user input detector 122 may receive input data from one or more components of the social networking system 102, or from one or more remote locations.

The social networking application 118 can perform one or more functions in response to the user input detector 122 detecting user input and/or receiving other data. Generally, a user can control, navigate within, and otherwise use the social networking application 112 by providing one or more user inputs that the user input detector 122 can detect. For example, in response to the user input detector 122 detecting user input, one or more components of the social networking application 118 allow a user to select a recipient for a message, compose a message, select content to include in a message, and/or send a message to the recipient. Additionally, in response to the user input detector 122 detecting user input, one or more components of the social networking application 118 allow a user to navigate through one or more user interfaces to review received electronic messages, for-sale postings, etc.

As illustrated in FIG. 1, the for-sale group system 100 can include the social networking system 102. The social networking system 102 can also provide social networking system posts (whether text or otherwise) to a social networking graphical user interface (e.g., a profile, a newsfeed, or "wall") of one or more users of the social networking system 102. For example, one or more embodiments may present a user with a social networking system newsfeed and electronic messages from one or more co-users associated with the user via the social networking system 102. In one or more embodiments, the user may scroll through the social networking system newsfeed in order to view recent social networking system posts submitted by the one or more co-users associated with the user via the social networking system 102. In one embodiment, the social networking system 102 may organize the social networking system posts chronologically in a user's social networking system newsfeed. In alternative embodiments, the social networking system 102 may organize the social networking system posts geographically, by interest groups, according to a relationship coefficient between the user and the co-user, etc. Additionally, in one or more embodiments, the user may download a copy of the social networking system newsfeed as a record of the social networking system posts displayed thereon.

Additionally, in one embodiment, the social networking system 102 can transmit social networking system posts and/or electronic messages between users. For example, in response to a user submitting a social networking system post to the social networking system 102, the social networking system 102 can update the social networking system newsfeeds of the co-users who are "friends" with the user. Furthermore, in one embodiment, the social networking system 102 can transmit an electronic message between just two users. In that case, the social networking system 102 does not add the electronic message to the social networking newsfeed to a plurality of co-users, but rather provides the electronic message within a social networking graphical user interface (e.g., an inbox) of one or more message recipients. In other words, an electronic message can be a private message between two users of the social networking system 102, and a social networking system post may be a semi-public message that the social networking system 102 adds to the social networking system newsfeeds of a plurality of co-users of the social networking system 102.

As mentioned above, and as illustrated in FIG. 1, the social networking system 102 can further include the for-sale group manager 104, which can manage all activities in connection with one or more for-sale groups and/or activities. The for-sale group manager 104 can include a social networking system activity manager 106, which in turn can communicate with the social networking system 102 to receive various types of user-specific information. In one or more embodiments, the social networking system activity manager 106 can receive user-specific information related to sellers who submit one or more sale listings to a for-sale group. Additionally, in one or more embodiments, the social networking system activity manager 106 can receive user-specific information related to potential purchasers associated with one or more sale listings in a for-sale group. As mentioned above, the for-sale group manager 104 can utilize various types of user-specific information in determining a likelihood that an item advertised by a sale listing has been sold in an off-line transaction.

For example, the social networking system activity manager 106 can communicate with the social networking system 102 to receive information associated with a particular seller's and/or potential purchaser's social networking activities. Within the social networking system 102, a seller and/or potential purchaser can view and "like" posts, click links, submit posts, comments, and messages, upload and tag photographs and videos, check-in at various locations, become a member of various groups, and so forth. Accordingly, in one or more embodiments, the social networking system activity manager 106 can receive information from the social networking system 102 associated with all the activities undertaken by a particular seller and/or potential purchaser on the social networking system 102. The social networking system activity manager 106 can receive information related to a user's social networking activities as they occur, or in alternative embodiments, can receive a history of the seller's and/or potential purchaser's social networking activities.

The for-sale group manager 104 can later utilize the information associated with a particular seller's and/or potential purchaser's social networking activities to determine a likelihood as to whether a particular item advertised via a sale listing as been sold. For example, if a potential purchaser frequently "likes" social networking system posts that include information about rock climbing, and then later sends a private message to a seller who has submitted a sale listing for rock climbing gear, the for-sale group manager 104 may increase the likelihood (e.g., increase a score or other metric representing the likelihood) that the seller sells the rock climbing gear to the potential purchaser. In another example, if a potential purchaser submits several comments related to a particular sale listing, and then later the potential purchaser and the seller associated with the sale listing check-in at the same location, the for-sale group manager 104 may increase the likelihood that the seller sells the item advertised in the sale listing to the potential purchaser.

Furthermore, the social networking system activity manager 106 can communicate with the social networking system 102 to receive profile information that is specific to a particular seller and/or potential purchaser. In one or more embodiments, a seller's and/or potential purchaser's profile information can include demographic information (e.g., education, location, hometown, birthday, employment, salary, family and romantic relationships, etc.), as well as information on personal interests (e.g., favorite books, movies, restaurants, etc.). The for-sale group manager 104 may utilize this profile information to determine a likelihood as to whether a particular item advertised via a sale listing has been sold. For example, if a potential purchaser who has commented on a particular sale listing is a family member of the seller associated with the sale listing, the for-sale group manager 104 may increase the likelihood that the seller sold the item advertised by the sale listing to the potential purchaser. Similarly, if a potential purchaser has indicated in his profile that he loves a particular sports team and then later sends a message to a seller associated with a sale listing featuring tickets for that sports team, the for-sale group manager 104 may increase the likelihood that the seller sold the tickets to the potential purchaser.

Additionally, the social networking system activity manager 106 can communicate with the social networking system 102 to receive information related to social networking system relationships between sellers and potential purchasers within the social networking system. For example, a seller may be "friends" with one or more potential purchasers. Thus, in one or more embodiments, the seller can view social media posts submitted by friends, comment on friends' social media posts, reply to messages sent by friends, add tags to photographs and videos submitted by friends, view location check-ins of friends, etc. Accordingly, the social networking system activity manager 106 can communicate with the social networking system 102 to receive information related to the seller's friend activity. In at least one embodiment, the for-sale group manager 104 may increase the likelihood that an item advertised in a sale listing has been sold to a potential purchaser who commented on the sale listing and who is friends with the seller associated with the sale listing.

Moreover, the social networking system activity manager 106 can communicate with the social networking system 102 to receive information related to a particular user's group memberships. As mentioned above, the social networking system 102 can host a web page dedicated to a particular group. The group can use the social networking system web page to display postings from group members (e.g., postings advertising items that group members would like to sell). Accordingly, the social networking system activity manager 106 can receive information from the social networking system 102 related to the groups in which a particular seller and/or potential purchaser is a member. In at least one embodiment, the for-sale group manager 104 can utilize a potential purchaser's for-sale group memberships to determine a likelihood that the potential purchaser has purchased a particular item. For example, if the potential purchaser is a member of multiple for-sale groups that are dedicated to the purchase and sale of classic car parts, the for-sale group manager 104 may increase the likelihood that the potential purchaser has purchased a particular classic car part based on the potential purchaser having commented on a for-sale listing advertising the classic car part.

In addition to receiving various types of user-specific information, the social networking system activity manager 106 can analyze user-specific information to determine a particular user's interests. For example, as described above, the social networking system activity manager 106 can receive information associated with a particular user's social networking system activities, the particular user's social networking system profile, the particular user's friends social networking system activities, etc. In one or more embodiments, the social networking system activity manager 106 can analyze this information to determine interests, likes, and dislikes of a seller and/or potential purchaser.

For instance, if a potential purchaser frequently comments on a friend's photographs of dogs, the social networking system activity manager 106 may determine that the potential purchaser is interested in dogs. Similarly, if a potential purchaser's friends are frequently posting and commenting on articles about parenting, the social networking system activity manager 106 may determine that the seller is also interested in topics related to parenting. In at least one embodiment, the for-sale group manager 104 can utilize the interests of a potential purchaser to determine a likelihood of whether the potential purchaser has purchased an item featured in a for-sale listing with which the potential purchaser has interacted in some way (e.g., via clicking "like," commenting, messaging, etc.)

In at least one embodiment, the social networking system activity manager 106 can also analyze the content of a user's posts and messages in order to determine the user's interests. For example, the user may comment, "I really disagree with this!" on a political article that one of the user's friends has included in a social media post. In one or more embodiments, the social networking system activity manager 106 can determine that the user dislikes the article, even though the user commented on the article. The social networking system activity manager 106 can identify key words and phrases, subject matter, and natural language as part of its analysis of various types of user-specific information.

As mentioned above, and as illustrated in FIG. 1, the for-sale group manager 104 can also include a for-sale listing manager 108. As mentioned above, the social networking system 102 can host for-sale groups where social networking system users buy and sell goods in a non-commercial setting. Accordingly, the for-sale listing manager 108 can receive, organize, analyze, and display sale listings related to each for-sale group hosted by the social networking system 102. A sale listing may refer to a user-to-user social networking system post submitted by a for-sale group member that advertises a particular item that the user hopes to sell and/or purchase. In one or more embodiments, a user-to-user sale listing can be different from a standard social networking system post in several ways. For example, the social networking system generally adds a post from a user to the newsfeeds of friends associated with the user, while the social networking system typically adds a sale listing only to the newsfeed associated with the for-sale group where the sale listing was submitted. Additionally, social networking system posts are generally opinion or news based, while sale listings generally only advertise items available for sale or purchase.

As used herein, user-to-user social networking system posts generally do not include any posts, sale listings, or advertisements submitted by a commercial retailer or merchant. Rather, the sales listings and posts discussed herein refer to end users of the social networking system selling items to other end users. For example, the posts and sales listings discussed herein are typically provided without any sort of payment for marketing in order to provide the post. Furthermore, a user-to-user social networking system post does not include a post, sale listing, or advertisement that is submitted to the social networking system by any entity that identifies itself as a commercial retailer.

Accordingly, in one or more embodiments, the for-sale listing manager 108 can receive, organize, analyze, display, and track sale listings submitted to a for-sale group. For example, in one embodiment, a seller may compose a sale listing including an item description and photograph, and then submit the composed sale listing to the for-sale group manager 104. In response to the submission, the for-sale listing manager 108 can organize the sale listing among other sale listings (e.g., chronologically, or based on a type or theme, etc.) and display the sale listing within at least one for-sale group. In one or more embodiments, the for-sale listing manager 108 displays the received sale listing only in the for-sale group to which the seller is a member. Alternatively, the for-sale listing manager 108 may also display the received sale listing in other for-sale groups including members who may be interested in the item. As mentioned above, a sale listing becomes active as soon as the for-sale listing manager 108 displays the sale listing as part of a for-sale group.

Next, the for-sale listing manager 108 can identify a variety of information related to an item advertised in a sale listing in order to make certain determinations related to the sale listing. In at least one embodiment, the for-sale listing manager 108 can identify information related to the item advertised in a sale listing that indicates a period of time within which the item can be expected to sell. By way of example, the for-sale listing manager 108 may identify a sale listing for a bicycle that has been active in a particular for-sale group for two weeks. The for-sale listing manager 108 may determine that similar bicycles typically sell within that particular for-sale group within just one week. In response to that determination, the for-sale listing manager 108 can prompt the bicycle seller to take action related to the sale listing. Alternatively or additionally, the for-sale listing manager 108 may allow more time for other types of items. For example, the for-sale listing manager 108 may not prompt a seller to take action related to a sale listing for a real estate property for several months in response to a determination that real estate properties typically take several months to sell.

Further, the for-sale listing manager 108 can identify a product-type associated with the item advertised by the sale listing in order to determine a period of time within which an item is expected to sell. For example, if the sale listing advertises a particular car part, the for-sale listing manager 108 may identify "automotive" as the product-type associated with the item. In one or more embodiments, the for-sale listing manager 108 can further identify one or more sub-types associated with the item so as to classify the item with a high level of granularity (e.g., a product-type can be "automotive," while a sub-type may be "engine part"). The for-sale listing manager 108 can utilize the product-type of an item to determine that other items of the same product-type generally sell in a certain amount of time, and then to prompt the item seller when that amount of time elapses.

Additionally, the for-sale listing manager 108 can also identify other information related to the sale listing that are indicative of a period of time within which the item is expected to sell. For example, the for-sale listing manager 108 can identify information related to other similar sale listings. Once the for-sale listing manager 108 has identified a product-type associated with the item advertised in a sale listing, the for-sale listing manager 108 can identify an average amount of time sale listings advertising other items of the same product-type were active. Additionally, the for-sale listing manager 108 can identify other helpful information such as a typical price associated with items of the same product-type. The for-sale listing manager 108 can identify this information based on stored data, on an Internet search, etc.

The typical length of time for an item associated with a sale listing to be sold via a for-sale group is generally the same as the length of time that elapses between a sale listing becoming active, and the determination of when a sale of the item advertised in the listing has likely taken place (e.g., based on factors described in more detail below). Additionally or alternatively, in some instances, the length of time for an item to be sold is the same as the length of time that elapses between sale listing associated with the item becoming active, and the removal of the sale listing from the for-sale group by the item seller or the marking the sale listing as being sold.

Additionally, the for-sale listing manager 108 can identify a history of similar sales associated with an identified product-type. For example, in at least one embodiment, a certain for-sale group may be dedicated to a buying and selling a particular type of item. In that case, the for-sale group manager 104 can analyze a history of sales associated with the particular type of item. For example, in a for-sale group dedicated to the sale and purchase of car parts, the for-sale listing manager 108 can identify a history associated with the sale and purchase of car parts via that for-sale group. In one or more embodiments, the history of similar sales associated with a product-type can include a volume of items advertised of that product-type, a volume of items purchased of that product-type, representative descriptions of items of that product-type, typical price-ranges associated with the sale and purchase of items of that product-type, a social networking system advertising saturation level associated with the product-type, etc. This information can help inform the determination made by the for-sale listing manager 108 as to how long the sale of a particular item can be expected to take via a for-sale group.

In a similar manner, the for-sale listing manager 108 can identify a history of similar sales associated with the product-type within a geographic region. For example, bicycles may be a popular item among for-sale groups that are based in metropolitan areas, while trucks may be more popular among for-sale groups based in rural areas. Accordingly, in one or more embodiments, the for-sale listing manager 108 can identify a history of similar sales within a geographic region associated with a particular for-sale group.

Additionally, the for-sale listing manager 108 can identify a cost associated with an item that is advertised within a sale listing. For example, the for-sale listing manager 108 can identify a seller's asking price for a particular item based on a description the seller includes as part of the sale listing. Alternatively or additionally, the for-sale listing manager 108 can utilize stored data or web lookups to determine a typical cost for items similar to an item advertised within a sale listing. In one or more embodiments, the for-sale listing manager 108 may adjust the period of time within which an item is expected to sell based on the cost of the item. For instance, the for-sale listing manager 108 may determine that expensive and/or overpriced items take longer to sell than cheap and/or underpriced items.

Furthermore, in at least one embodiment, the for-sale listing manager 108 can identify a volume of sales associated with other items similar to the item advertised in a received sale listing. Based on sales information identified from various for-sale groups, the for-sale listing manager 108 can determine that a particular item or type of item is very popular and generally sells quickly. Thus, as mentioned above, the for-sale listing manager 108 may prompt a seller to take action on a sale listing for a popular item that is still active after a certain period of time.

Once the for-sale listing manager 108 determines how quickly a particular item should sell, the for-sale listing manager 108 can also analyze the social networking activity received by the social networking system activity manager 106 in order to determine whether an actual sale of an item has taken place off-line. For example, in response to a seller's submission of a sale listing featuring a particular type of baby stroller, the for-sale listing manager 108 can identify information related to similar sale listings to determine that the featured baby stroller is very popular and will likely sell within five days of the sale listing becoming active. After the five-day time period elapses, the for-sale listing manager 108 can analyze social networking activity associated with the baby stroller sale listing to determine whether a sale has taken place. Due to the nature of for-sale groups within the social networking system 102, the advertising of an item as well price negotiations and pick-up/drop-off arrangements generally take place on-line within the for-sale group. However, because the buyers and sellers of items via for-sale groups tend to be normal people rather than retail entities, the actual sale transaction (i.e., the buyer giving the seller money, and the seller giving the buyer the item), typically occurs off-line.

Accordingly, the for-sale listing manager 108 can analyze comments and messages associated with a sale listing in order to determine a likelihood that the item advertised by the sale listing has been sold off-line. For example, for-sale group members can comment on a sale listing in order to ask the seller a question about the item, negotiate a price, state intent to buy the item, etc. Any member of the for-sale group can see a comment on a sale listing. Alternatively, a potential buyer can send a private message to the item seller to ask questions, etc.

The for-sale listing manager 108 can analyze comments and messages associated with a sale listing to identify language that is indicative of an off-line sale having taken place. For example, language that is indicative of an off-line sale having taken place can include "transactional" language, such as, but not limited to: interest indicating language (e.g., "I am very interested in this item"), price negotiation language (e.g., "will you take $40?"), pick-up/drop-off language (e.g., "I'll meet you at the parking lot at the corner of $5^{th}$ Street and Lincoln at 5 pm"), contact details language (e.g., "Call me at 555-555-5555"), etc. In one or more embodiments, the for-sale listing manager 108 can distinguish language that is indicative of an off-line sale from language that merely indicates interest. For example, language that merely indicates interest can include questions about the item (e.g., "Can you tell me the mileage of this bicycle?"), and other comments or statements that are not related to the sale of the item (e.g., "I love the color of this bike!"). The for-sale listing manager 108 can analyze and identify language in comments and messages associated with a sale listing by utilizing natural language processing, grammars, databases, web look-ups, or any other technique for analyzing text.

Furthermore, the for-sale listing manager 108 can analyze other identified social networking system activity that may be indicative of an off-line sale having taken place. In at least one embodiment, if an item seller and a potential buyer are friends through the social networking system, the for-sale listing manager 108 can identify any comments or messages between the seller and potential buyer. For example, if a potential buyer comments, "This is exactly what I've been looking for!" on an item being sold by a friend, the for-sale listing manager 108 may determine that an off-line sale of the item has likely taken place, even though the language of the comment is not highly indicative of an off-line sale.

The for-sale listing manager 108 can also assign a weight to different types of information related to a sale listing. For example, the for-sale listing manager 108 can assign a weight to the item information based on the product-type of the item, based on the popularity of other similar listings within a given for-sale group, based on the popularity of other similar listings within a geographic area, based on the popularity of other similar listings within a demographic segment, etc. In response to assigning a heavier weight to a particular sale listing, the for-sale listing manager 108 can shorten the determined period of time within which the item associated with the sale listing is expected to sell. Conversely, in response to assigning a lighter weight to a particular sale listing, the for-sale listing manager 108 can lengthen the determined period of time within which the item associated with the sale listing is expected to sell.

Additionally, the for-sale listing manager 108 can assign a weight to various types of social networking activity. For example, the for-sale listing manager 108 can assign a heavy weight to a comment associated with a sale listing with language highly indicative of an off-line sale having taken place. Further, the for-sale listing manager 108 can assign a light weight to a potential purchaser's "like" of a sale listing. As the social networking activity associated with a particular sale listing becomes more heavily weighted, the for-sale listing manager 108 can more readily determine that an off-line sale associated with the sale listing has taken place and that the item advertised therein is no longer available.

Once the for-sale listing manager 108 has identified, analyzed, and weighted information related to the sale listing (e.g., item information, and social networking activity information associated with the sale listing, the seller, and one or more potential purchasers), the for-sale listing manager 108 can also determine a likelihood that an off-line purchase related to the sale listing has taken place. In one or more embodiments, the for-sale listing manager 108 can calculate likelihood as a score. For example, the for-sale listing manager 108 can assign a value to certain information associated with the scale listing (e.g., a comment with indicative language can be assigned a high value, while an advertised item that is not very popular may be assigned a low value, etc.) If the for-sale listing manager 108 calculates a score for a sale listing above a predetermined threshold, the for-sale listing manager 108 can determine that an off-line sale of the item advertised by the sale listing has likely taken place.

Alternatively, rather than calculating a score, the for-sale listing manager 108 may simply make a binary determination that the product has been sold. For example, the for-sale listing manager 108 may determine an item has likely been sold in response to highly indicative language in a sale listing comment or message. To illustrate, if a potential purchaser submits a sale listing comment that states, "I would like to purchase this, and I can pay the price your are asking. I can pick the item up today," the for-sale listing manager 108 can determine that the item has likely been sold without calculating a more comprehensive score related to the sale listing.

In response to determining that an off-line sale of a particular item has likely taken place, the for-sale listing manager 108 can prompt the seller associated with the sale listing to take action. For example, the for-sale manager 108 can prompt the seller to update the sale listing to indicate that the item advertised therein is no longer available for purchase. Additionally or alternatively, the for-sale manager 108 can prompt the seller to remove the sale listing altogether.

Additionally or alternatively, the for-sale listing manager 108 can prompt a seller to take action with regard to a sale listing that has been active for too long. For example, the for-sale listing manager 108 may determine that other similar sale listings typically cease being active within a given window, and that the seller's sale listing has been active for longer than the given window (e.g., this may be due to lack of interest, fraud, etc.). The for-sale listing manager 108 can prompt the seller to update or remove the sale listing, even if there is no information associated with the sale listing that indicates an off-line sale has taken place.

In one or more embodiments, the for-sale listing manager 108 may provide different levels of prompts to a seller depending on how long a sale listing has been active and/or how likely it is that the item advertised therein has been sold. For example, if an item is expected to sell within two weeks, the for-sale listing manager 108 may provide the item seller with a simple pop-up prompt within the social networking system 102 after the sale listing associated with the item has been active for two weeks. Alternatively, if the sale listing is associated with social networking activity that is highly indicative of an off-line sale, the for-sale listing manager 108 may change the display of the sale listing to include a button or hyperlink that the seller can user to mark the item in the sale listing as sold.

Additionally, in one or more embodiments, if a seller associated with a sale listing fails to act in response to a prompt within a reasonable amount of time, the for-sale listing manager 108 can take various actions. For example, in one embodiment, the for-sale listing manager 108 can automatically update the sale listing with no further input from the seller. Alternatively or additionally, the for-sale listing manager 108 may deactivate or archive the sale listing (i.e., remove the sale listing from the for-sale group such that the sale listing is no longer searchable or displayed). Furthermore, the for-sale listing manager 108 may reflect the seller's lack of attention in a poor seller rating, etc.

Furthermore, as mentioned above, and as illustrated in FIG. 1, the for-sale group manager 104 can also include a data storage 110. As shown, the data storage 110 can include social networking system activity data 112 and for-sale listing data 114. In one or more embodiments, the social networking system activity data 112 can include data representative of social networking system activity information, such as described herein. Similarly, in one or more embodiments, for-sale listing data 114 can include data representative of for-sale listing information, also as described herein.

Figure 2:
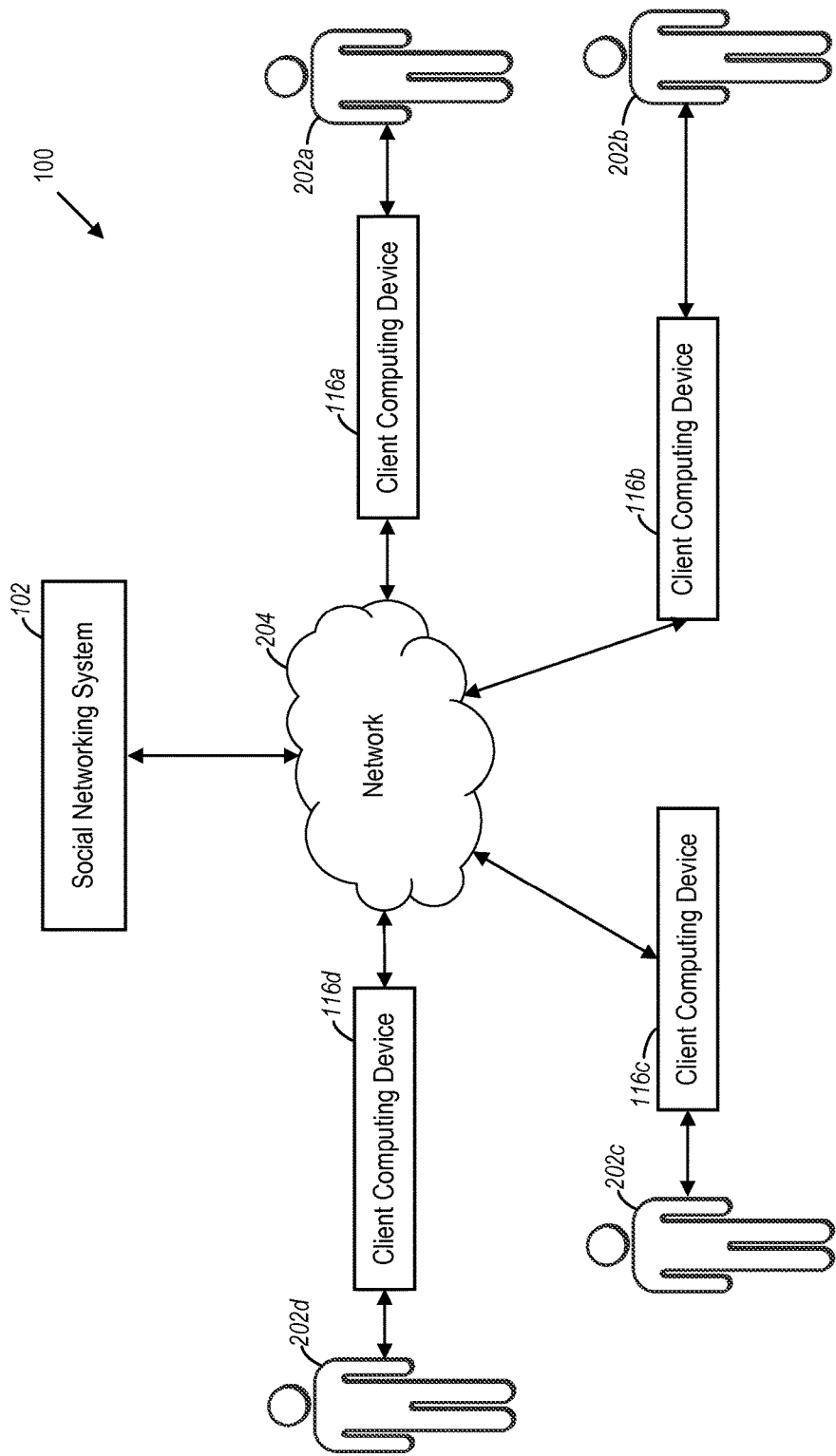
FIG. 2 illustrates a block diagram of an environment for implementing the for-sale group system in accordance with one or more embodiments.

FIG. 2 illustrates an example schematic diagram of the for-sale group system 100. As illustrated in FIG. 2, the for-sale group system 100 may include client computing devices 116a-116d, and the social networking system 102, which are communicatively coupled through a network 204. Also as illustrated in FIG. 2, users 202a, 202b, 202c, and 202d may interact with client computing devices 116a, 116b, 116c, and 116d, respectively in order to access content and/or services on the social networking system 102. Each of the client computing device 116a-116d may access the social networking system 102 via the social networking application 118, as described above with respect to FIG. 1.

The client computing devices 116a-116d and the social networking system 102 can communicate via the network 204, which may include one or more networks and may use one or more communication platforms or technologies suitable for transmitting data and/or communication signals. In one or more embodiments, the network 204 may include the Internet or World Wide Web. The network 204, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 2 illustrates a particular arrangement of the client computing devices 116a-116d, the social networking system 102, and the network 204, various additional arrangements are possible. For example, the client computing devices 116a-116d may directly communicate with the social networking system 102, bypassing the network 204. Additional details relating to the network 204 are explained below with reference to FIG. 7.

As illustrated in FIG. 2, the for-sale group system 100 can include the users 202a-202d. As described above, the users 202a-202d may be individuals (i.e., human users), businesses, groups, or other entities. Although FIG. 2 illustrates four users 202a-202d, it is understood that the for-sale group system 100 can include a plurality of users, with each of the plurality of users interacting with the for-sale group system 100 through a corresponding plurality of client computing devices.

With referent to the for-sale group system 100 described herein, if the users 202a-202d are social networking system friends, any of the users 202a-202d may be a sender of a social networking system post or message, and any of the user 202a-202d may be a recipient of a social networking system post or message. Furthermore, any of the users 202a-202d may submit and view sale listings to for-sale groups hosted by the social networking system 102. In some embodiments, a for-sale group may require the users 202a-202d to become group members before they are allowed to submit and view sale listings. In other embodiments, a for-sale group may have an open policy that allows the users 202a-202d to submit and view sale listings without being members of the for-sale group.

The client computing devices 116a-116d may include various types of computing devices. For example, the client computing devices 116a-116d can include a mobile device such as a mobile telephone, a smartphone, a PDA, a tablet, a laptop or a non-mobile device such as a desktop, a server, or another type of computing device. Further, the client computing devices 116a-116d may run dedicated social networking applications (e.g., such as the social networking application 118, as described above in relation to FIG. 1) associated with the social networking system 102 to access social networking content (e.g., posts, messages, sale listings, profiles, etc.) associated with the for-sale group system 100. Additional details with respect to the client computing devices 116a-116d are discussed below with respect to FIG. 6.

As will be described in more detail below, the components of the for-sale group system 100 as described with regard to FIGS. 1 and 2 can provide, along and/or in combination with other components, one or more graphical user interfaces ("GUIs"). In particular, the components can allow a user to interact with a collection of display elements for a variety of purposes. Specifically, FIGS. 3A-3E and the description that follows illustrate various example embodiments of the user interfaces and features that are in accordance with general principles as described above.

Figure 3E:
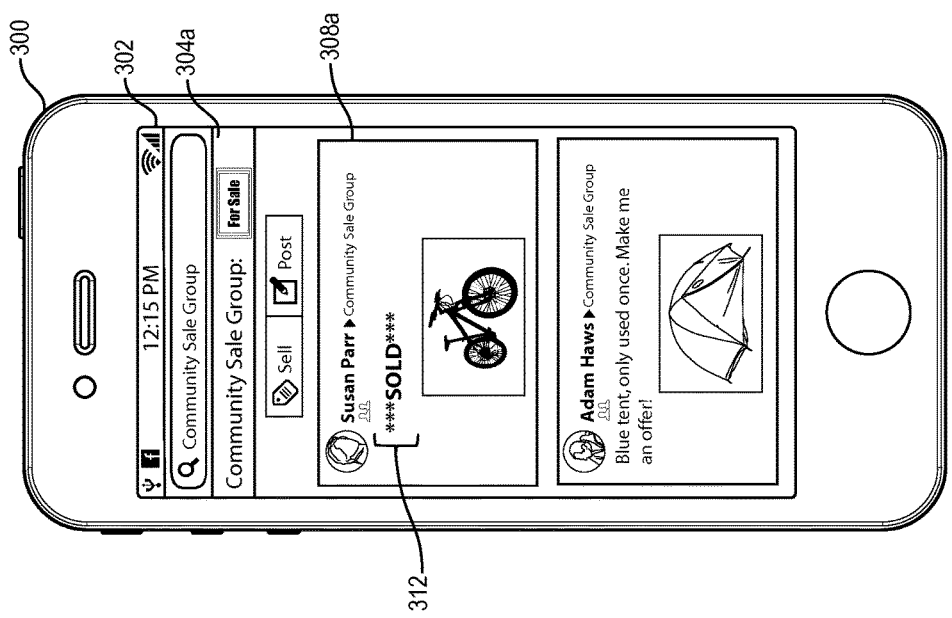

For example, FIGS. 3A-3E illustrate various views of GUIs provided at the client computing devices 116a, 116b, 116c, or 116d by way of the social networking application 118. As mentioned above, in some embodiments, a client computing device (i.e., the client computing device 116a, 116b, 116c, or 116d) can implement and/or provide features from the for-sale group system 100. For example, FIG. 3A illustrates a client computing device 300 of a potential purchaser (e.g., the user 202a, 202b, 202c, or 202d) that may implement one or more of the components or features of the for-sale group manager 104. As shown, the client computing device 300 is a handheld device, such as a mobile phone device (e.g., a smartphone). As used herein, the term "handheld device refers to a device sized and configured to be held/operated in a single hand of a user. In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 3A, the client computing device 300 includes a touch screen display 302 that can display user interfaces and by way of which user input may be received and/or detected. As used herein, a "touch screen display" refers to the display of a touch screen device. In one or more embodiments, a touch screen device may be the client computing device 116a, 116b, 116c, or 116d with at least one surface upon which a user may perform touch gestures (e.g., a laptop, a tablet computer, a personal digital assistant, a media player, a mobile phone, etc.). Additionally or alternatively, the client computing device 300 may include any other suitable input device, such as a touch pad or those described below in reference to FIG. 6.

In FIG. 3A, the touch screen display 302 of the client computing device 300 displays a for-sale group GUI 304a provided by the GUI manager 120 installed thereon. In one or more embodiments, the GUI manager 120 provides the for-sale group GUI 304a in order to display one or more sale listings submitted by various sellers. For example, as shown in FIG. 3A, the for-sale group GUI 304a can include one or more sale listings 308a, 308b, and 308c in a feed. In additional or alternative embodiments, the feed of sale listings 308a-308c can be scrollable, and can include various selectable elements. In yet further embodiments, the sale listings 308a-308c can be included in a standard newsfeed for the user.

Additionally, the for-sale group GUI 304a can include upload controls 306a and 306b. By utilizing the upload control 306a, a seller can compose and submit a sale listing advertising an item for sale. By utilizing the upload control 306b, a potential purchaser can compose and submit a post informing the community associated with a particular for-sale group that the potential purchaser is looking to purchase a particular item (e.g., an "in search of" post, etc.) or submit a general post that is unrelated to a sale of an item.

Each of the sale listings 308a-308c displayed as part of the for-sale group GUI 304a can include information identifying the seller associated with the sale listing, as well as information associated with the item advertised therein. For example, as shown in FIG. 3A, the sale listing 308a includes seller information 310, an item description 312, and item media 314. The seller information 310 can include a profile picture associated with the seller, as well as the seller's name. Additionally, in some embodiments, the seller information 310 can include a date and time when the seller submitted the sale listing 308a, as well as a location from which the seller submitted the sale listing 308a. Furthermore, as described in more detail below with reference to FIG. 7, the sale listing 308a can also be associated with node and edge data.

The for-sale group manager 104 includes the item description 312 and the item media 314 as part of the sale listing 308a in order to provide an accurate depiction of the item for any potential purchaser who might be interested in the sale listing 308a. For example, the item description 312 includes information detailing the condition of the item and the price that the seller is asking. In additional or alternative embodiments, the item description 312 can include a detailed description of the item, the item's history of usage, the age of the item, the seller's preferred method of contact, an indication as to whether the seller is willing to negotiate, and so forth. Similarly, the item media 314 illustrated in FIG. 3A is a digital photograph of the item (i.e., a bike). In additional or alternative embodiments, the item media 314 can include multiple digital photographs, audio recordings, video recordings, and/or hyperlinks.

In response to a potential purchaser selecting the sale listing 308a, the GUI manager 120 can provide a sale listing GUI 304b via the touch screen display of the client computing device 300. For example, as illustrated in FIG. 3B, the sale listing GUI 304b includes the seller information 310, the item description 312, the item media 314, as well as social networking activity associated with the sale listing 308a. In one or more embodiments, the seller information 310 and the item description 312 are the same as that displayed in the for-sale group GUI 304a (e.g., as in FIG. 3A). In additional or alternative embodiment, the seller information 310 and the item description 312 included in the sale listing GUI 304b can include additional information specific to the seller and/or the item.

The social networking activity associated with the sale listing 308a, as illustrated in FIG. 3B, can include a like indicator 315 and comments 316a, 316b, and 316c. The like indicator 315 displays how many potential purchasers have "liked" the sale listing 308a. In one or more embodiments, the for-sale listing manager 108 can infer a high number of likes associated with a sale listing means that the item featured in the sale listing is popular. In turn, the for-sale listing manager 108 may shorten the period of time during which the item is expected to sell before the for-sale listing manager 108 will prompt the seller to take action with regard to the sale listing. Conversely, in response to a low number of likes, the for-sale listing manager 108 may lengthen the period of time during which the item is expected to sell before prompting the seller to take action in relation to the sale listing.

As mentioned above, social networking activity can also include one or more comments associated with a sale listing. For example, as shown in FIG. 3B, the sale listing 308a is associated with comments 316a-316c. In one or more embodiments, once the for-sale listing manager 108 has determined that the period of time during which the item is expected to sell has elapsed, the for-sale listing manager 108 can analyze the comments 316a-316c to determine a likelihood of whether the item advertised by the sale listing 308a has been sold off-line. As mentioned above, while the sale listing 308a advertises an item for sale, the actual sale transaction between the item seller and a purchaser generally takes place offline. As such, the for-sale listing manager 108 can analyze the comments 316a-316c to identify transactional language that is indicative of an off-line sale.

The for-sale listing manager 108 can utilize natural language processing, grammars, databases, web look-ups, or any other technique for analyzing text in order to identify language in the comments 316a-316d that is indicative of an off-line sale. For example, the for-sale listing manager 108 can analyze the comment 316a (i.e., "Do you have a mileage estimate?") to determine that the inquiry included in the comment 316a is merely a question about the item, and not very indicative of an off-line sale. The for-sale listing manager 108 can analyze the comment 316b (i.e., "I'm interested!") to determine that the statement included therein is more indicative of whether the item advertised in the sale listing 308a has been sold.

As mentioned above, the for-sale listing manager 108 can determine that offers of money are very indicative of an off-line sale. For example, the for-sale listing manager 108 can determine that the offer included in the comment 316c (i.e., "I'll pay $50 and I can pick up today!") is highly indicative of an off-line sale. In one or more embodiments, the for-sale listing manager 108 can determine that an offer of $45 extended in another comment is close to the asking price of $50. In response to this determination, the for-sale listing manager 108 can determine that the seller would likely accept such an offer.

Similarly the for-sale listing manager 108 can determine that the offer extended in the comment 316c (i.e., I'll pay $50 and I can pick up today!") is even more indicative of an off-line sale than the offer of $45. For example, the for-sale listing manager 108 can determine that the $50 offered in the comment 316c is the same amount as the seller's asking price. Additionally, the for-sale listing manager 108 can determine that the offer extended in the comment 316c includes additional pick up details, which in turn, can cause the for-sale listing manager 108 to determine that the comment 316c is highly indicative of an off-line sale having taken place.

As mentioned above, the for-sale listing manager 108 can determine the period of time during which the item advertised in the sale listing 308a should sell based on a variety of item information. For example, the for-sale listing manager 108 can determine that the item advertised in the sale listing 308a is popular and should sell quickly based on the number of "likes" associated with the sale listing 308a, the amount of time social networking system users spend looking at the sale listing 308a, the amount of time within which other similar items were sold via the for-sale group, the popularity of similar items within a certain geographic area, the popularity of similar items within a certain social networking system community (e.g., the for-sale group where the sale listing 308a is posted), etc. Accordingly, the for-sale listing manager 108 can determine that the item advertised in the sale listing 308a should sell quickly (e.g., within a week following submission of the sale listing 308a), or that the item should take longer to sell (e.g., in a few weeks, months, etc.) based on a variety of factors and criteria.

If the period of time during which the item advertised in the sale listing 308a has elapsed, the for-sale listing manager 108 can determine a likelihood that an off-line purchase related to the sale listing 308a has taken place by calculating a score based on item information and social networking activity information associated with the sale listing 308a. Accordingly, the for-sale listing manager 108 may calculate a high score for the sale listing 308a based on the comment 316c. The for-sale listing manager 108 can also factor information such as overall social networking system traffic related to the sale listing 308a into the score calculation (i.e., a high number of views, likes, and comments can be indicative of an off-line sale).

The for-sale listing manager 108 can perform the same analysis based on a private messaging session between the item seller and a potential purchaser. For example, as illustrated on the touch screen display 302 of the client computing device 300 shown in FIG. 3C, the item seller and a potential purchaser (i.e., "Eric") can privately message in a session related to the sale listing 308a via a messenger GUI 304c. In this embodiment, the for-sale listing manager 108 can include a textual analysis of messages from the seller in the determination as to whether an off-line sale of the item has taken place. For instance, the for-sale listing manager 108 can identify highly indicative language in the message 318a from the potential purchaser "Eric." Following this, the for-sale listing manager 108 can identify language in the message 318b from the seller that indicates the seller is willing to accept the offer made in the message 318a. Next, the for-sale listing manage 108 can identify other language in the messages 318c-318e that indicates further transaction details that are being worked out by the seller and the potential purchaser.

Based on the identified transactional language, the for-sale listing manager 108 can calculate a score above a predetermined threshold that indicates the item associated with the sale listing 308a has likely been sold off-line. Accordingly, in response to the indication that the item has likely been sold off-line, the for-sale listing manager 108 can prompt the seller to mark the item advertised in the sale listing 308a to mark the item as having been sold. For example, as shown in FIG. 3C, the for-sale listing manager 108 can provide a mark as sold control 320a, 320b within the messenger GUI 304c. In one or more embodiments, the for-sale listing manager 108 can provide the mark as sold control 320a in association with the sale listing 308a (e.g., as a hyperlink). Alternatively or additionally, the for-sale listing manager 108 can provide the mark as sold control 320b as a button within the communication thread including the messages 318a-318e.

In one or more embodiments, the for-sale listing manager 108 can prompt the user to take action with regard to the sale listing 308a in other ways. For example, as shown in FIG. 3D, the for-sale listing manager 108 can provide a marked as sold prompt 324 to the seller even when the seller is not looking at the for-sale group GUI 304a (e.g., as illustrated in FIG. 3A) or at the sale listing 308a. In one or more embodiments, the for-sale listing manager 108 can provide the marked as sold prompt 324 in the foreground of other GUIs, such as the newsfeed GUI 304d displayed on the touch screen display 302 of the client computing device 300 that includes multiple newsfeed posts 322a-322c.

The mark as sold prompt 324 can include various information (e.g., the picture and description taken from the sale listing 308a) to indicate to the seller the sale listing that the for-sale listing manager 108 has determined is likely no longer available. Additionally, the mark as sold prompt 324 can include input controls that allow the seller to indicate whether the item associated with the sale listing 308a has actually been sold (e.g., "yes" and "no" buttons). In additional or alternative embodiments, the for-sale listing manager 108 can prompt the seller via emails, text messages (e.g., via SMS), etc. in order to remind the seller to update the sale listing 308a.

In at least one embodiment, if the seller fails to indicate whether the item associated with the sale listing 308a has been sold within a default amount of time (e.g., one calendar month, 60 days, etc.), the for-sale listing manager 108 can automatically archive the sale listing 308a. For example, automatically archiving the sale listing 308a can include removing the sale listing 308a from any social networking system search results, and saving the sale listing 308a such that it is only accessible to the seller. Additionally, or alternatively, automatically archiving the sale listing 308a can include automatically updating the sale listing 308a to indicate the item associated with the sale listing 308a is not longer available.

In response to the seller indicating via the mark as sold controls 320a, 320b (e.g., as illustrated in FIG. 3C), or the mark as sold prompt 324 (e.g., as illustrated in FIG. 3D), the for-sale listing manager 108 can update the sale listing 308a to indicate that the item advertised therein is no longer available. For example, as shown in FIG. 3E, the for-sale listing manager 108 can update the item description 312 of the sale listing 308a within the for-sale group GUI 304a displayed on the touch screen display 302 of the client computing device 300 to indicate that the item advertised therein is no longer available. In additional or alternative embodiments, the for-sale listing manager 108 can remove the sale listing 308a from the for-sale group GUI 304a and/or de-rank the sale listing 308a such that it is no longer searchable or so that it is unlikely to surface to users.

FIGS. 1-3E, the corresponding text, and the examples, provide a number of different methods, systems, and devices for managing electronic messages via a social networking system. In addition to the foregoing, embodiments can also be described in terms of flowcharts comprising acts and steps in a method for accomplishing a particular result. For example, FIGS. 4-5 may be performed with less or more steps/acts or the steps/acts may be performed in differing orders. Additionally, the steps/acts described herein may be repeated or performed in parallel with one another or in parallel with different instances of the same or similar steps/acts.

Figure 4:
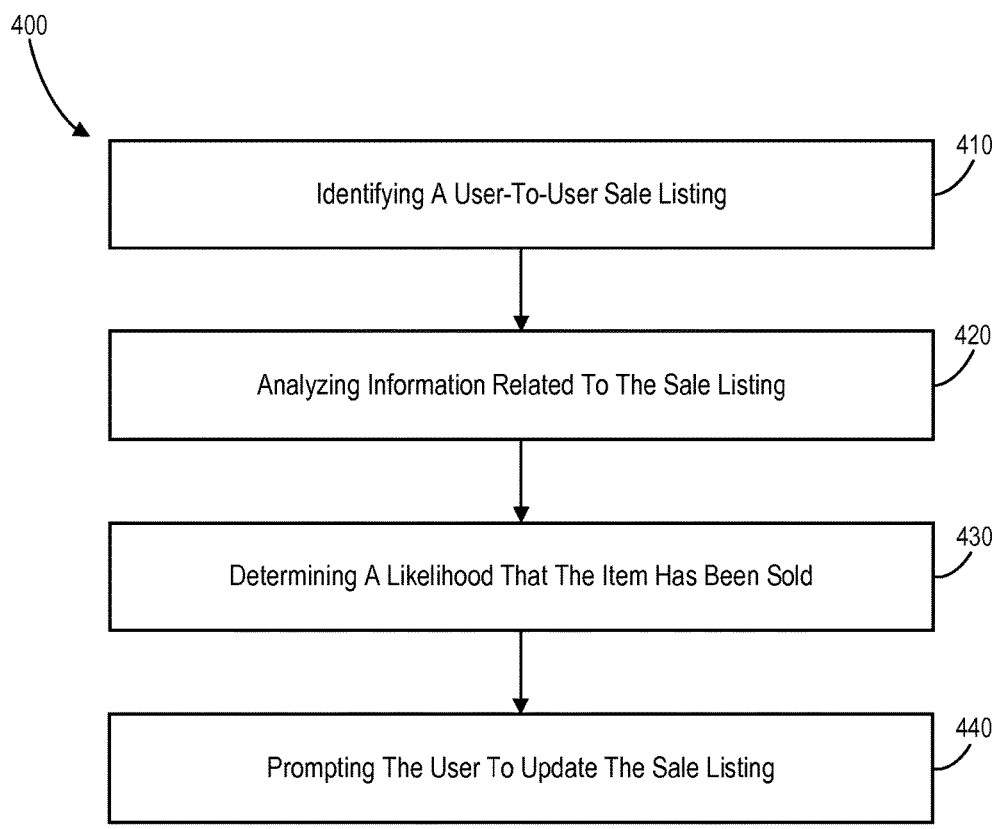
FIG. 4 illustrates a flowchart of a series of acts in a method of identifying sold indicators within a for-sale group in accordance with one or more embodiments.

FIG. 4 illustrates a flowchart of one example method 400 of identifying sold indicators within a for-sale group. The method 400 includes an act 410 of identifying a user-to-user sale listing. In particular, the act 410 can involve identifying a user-to-user sale listing (e.g., sale listing 308a) available on a social networking system, wherein the sale listing advertises an item for sale by a seller (e.g., one of the users 202a-202d). In one or more embodiments, the user-to-user sale listing is available on a social networking system (e.g., the social networking system 102) via a for-sale group (e.g., such as displayed in the for-sale group GUI 304a).

The method 400 further includes an act 420 of analyzing information related to the sale listing. In particular, the act 420 can involve analyzing information related to the sale listing, wherein the information related to the sale listing includes item information and social networking activity information. For example, in one or more embodiments, analyzing item information includes analyzing one or more of a description of the item (e.g., the item description 312), product-type associated with the item, a typical price associated with the product-type, a history of similar sales associated with the product-type, a history of sales associated with the product-type within a geographic region, a typical length of time associated with sales of items of the product-type associated with the item, or an advertising saturation level associated with the product-type. Additionally, in one or more embodiments, analyzing the social networking activity information includes analyzing one or more of a comment associated with the sale listing (e.g., the comments 316a-316d), a message associated with the sale listing (e.g., the messages 318a-318e), a social networking system association between the seller and a sender of a comment or a message, a period of time that has elapsed since the seller submitted the sale listing, a typical period of time that elapses before similar items are sold, or a volume of sales associated with other items similar to the item for sale by the seller via the social networking system.

Furthermore, in one or more embodiments, the analysis of the item information indicates whether the sale listing has been active for an amount of time that is longer than a typical length of time for sale listings of similar items, and if the sale listing has been active for an amount of time longer than the typical length of time for sale listings of similar items, the determined likelihood that the item has been sold is increased. Similarly, the analysis of the social networking activity information comprises a natural language processing analysis of comments and messages associated with the sale listing to identify whether the comments and messages associated with the sale listing include language indicating an off-line sale of the item has taken place, and if the comments and messages associated with the sale listing include language indicating an off-line sale of the item has taken place, the determined likelihood that the item has been sold is increased.

The method 400 further includes an act 430 of determining a likelihood that the item has been sold. In particular, the act 430 can involve determining, based on the analyzed information, a likelihood that the item has been sold. For example, in one or more embodiments, determining a likelihood that the item has been sold further includes calculating a score based on the analyzed information. Additionally, in one or more embodiments, the method 400 includes an act of determining a weight associated with each piece of item information and each piece of social networking activity information. In at least one embodiment, the determined weights are incorporated in the calculated score.

Furthermore, the method 400 includes an act 440 of prompting the user to update the sale listing. In particular, the act 440 can involve prompting, based on the determined likelihood, the user to update the sale listing. For example, in one or more embodiments, prompting the user to update the sale listing includes one or more of providing the user with a mark as sold prompt (e.g., the mark as sold prompt 324) or providing the user with a mark as sold control (e.g., the mark as sold control 320a, 320b). In at least one embodiment, prompting the user to update the sale listing is further based on the calculated score. Additionally, in some embodiments, the method 400 further includes an act of receiving, in response to being prompted, user input indicating the item has been sold, as well as, updating the sale listing to indicate the item is no longer for sale.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
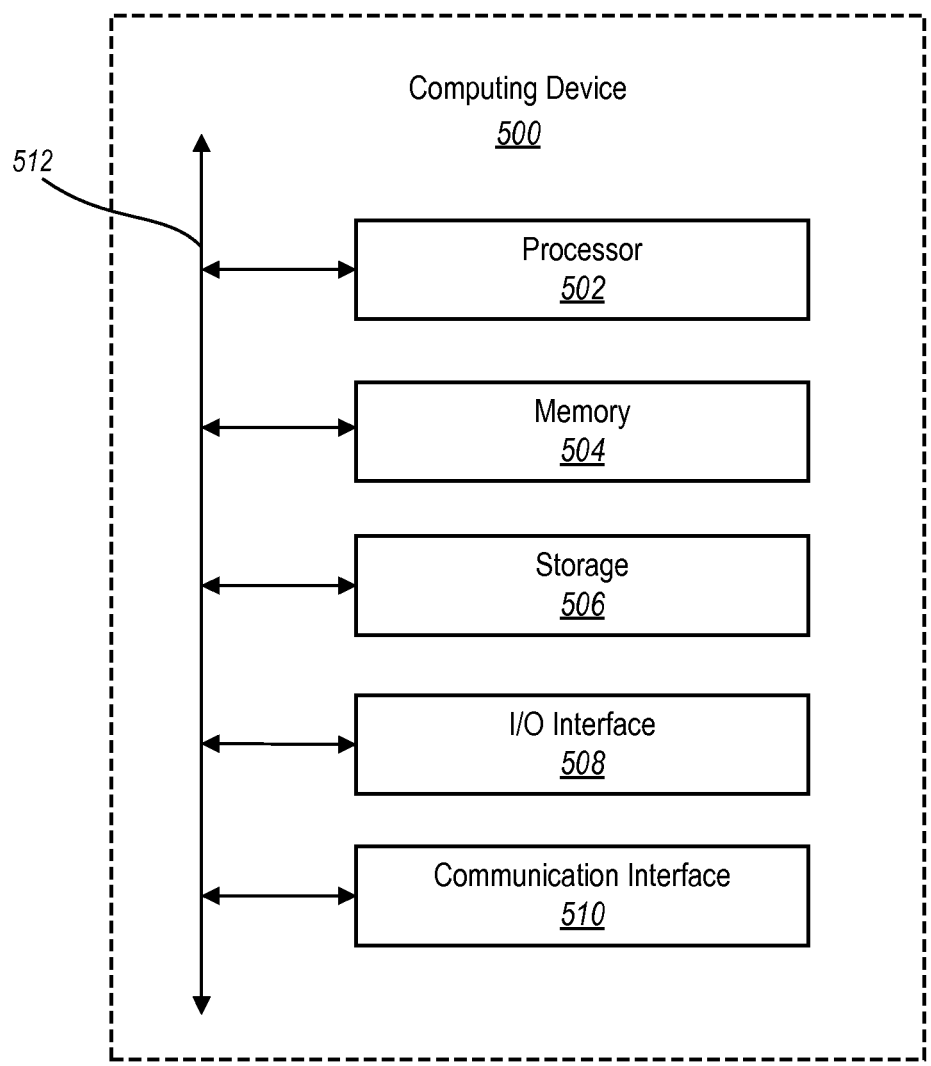
FIG. 5 illustrates a block diagram of an exemplary computing device in accordance with one or more embodiments.

FIG. 5 illustrates a block diagram of exemplary computing device 500 that may be configured to perform one or more of the processes described above. One will appreciate that one or more computing devices such as the computing device 500 may implement the system 100. As shown by FIG. 5, the computing device 500 can comprise a processor 502, a memory 504, a storage device 506, an I/O interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In one or more embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In one or more embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage 506.

The memory 504 may be used for storing data, metadata, and programs for execution by the processor(s). The memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, storage device 506 can comprise a non-transitory storage medium described above. The storage device 506 may include a hard disk drive (HDD), a floppy disk drive, flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In one or more embodiments, the storage device 506 is non-volatile, solid-state memory. In other embodiments, the storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 6:
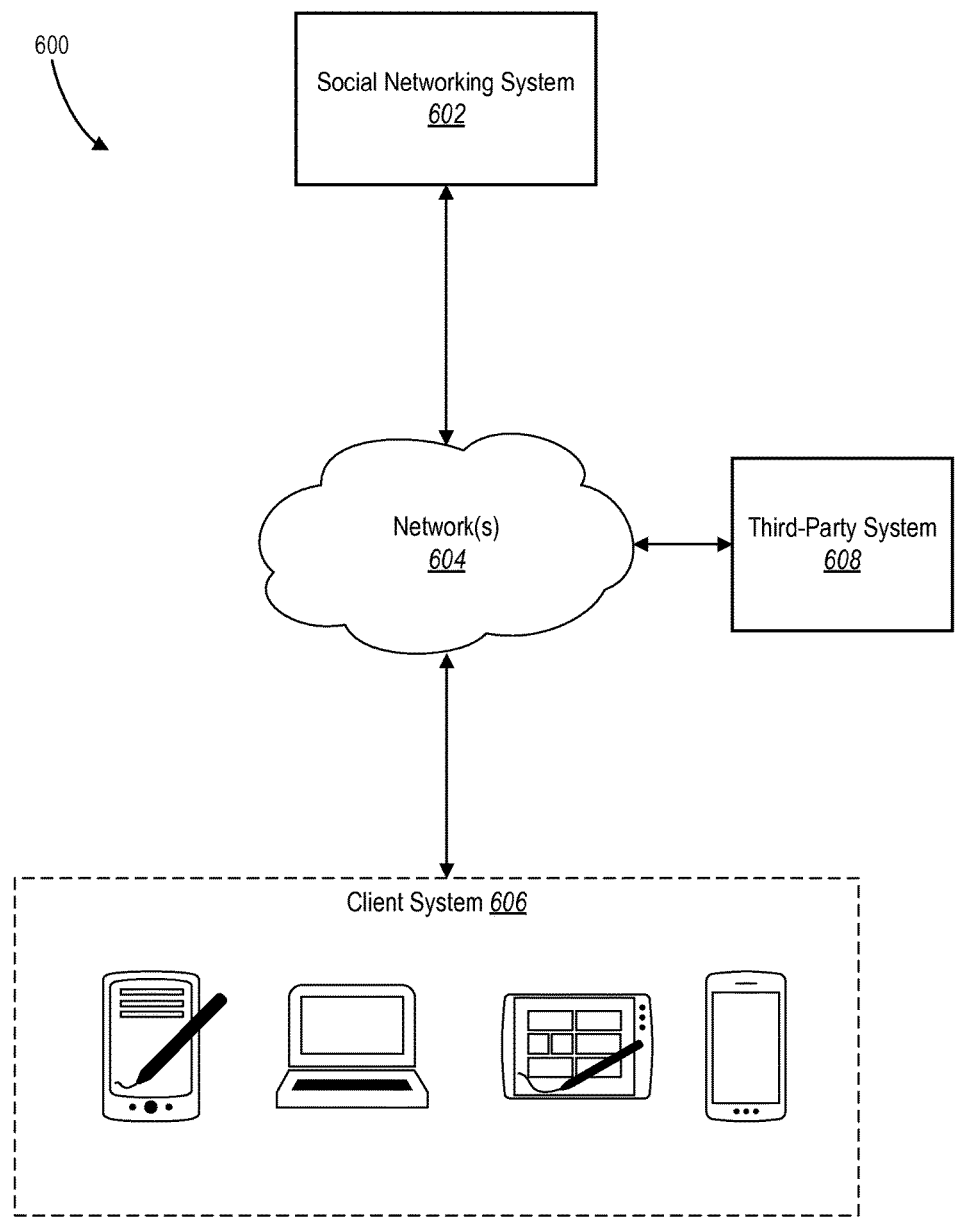
FIG. 6 is an example network environment of a social networking system in accordance with one or more embodiments.

FIG. 6 illustrates an example network environment 600 of a social networking system. Network environment 600 includes a client system 606, a social networking system 602, and a third-party system 608 connected to each other by a network 604. Although FIG. 6 illustrates a particular arrangement of client system 606, social networking system 602, third-party system 608, and network 604, this disclosure contemplates any suitable arrangement of client system 606, social networking system 602, third-party system 608, and network 604. As an example and not by way of limitation, two or more of client system 606, social networking system 602, and third-party system 608 may be connected to each other directly, bypassing network 604. As another example, two or more of client system 606, social networking system 602, and third-party system 608 may be physically or logically co-located with each other in whole or in part. Moreover, although FIG. 6 illustrates a particular number of client systems 606, social networking systems 602, third-party systems 608, and networks 604, this disclosure contemplates any suitable number of client systems 606, social networking systems 602, third-party systems 608, and networks 604. As an example and not by way of limitation, network environment 600 may include multiple client system 606, social networking systems 602, third-party systems 608, and networks 604.

This disclosure contemplates any suitable network 604. As an example and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client system 606, social networking system 602, and third-party system 608 to communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client system 606 may be an electronic device including hardware, software, or embedded logic components or a combination of two or more such components and capable of carrying out the appropriate functionalities implemented or supported by client system 606. As an example and not by way of limitation, a client system 606 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 606. A client system 606 may enable a network user at client system 606 to access network 604. A client system 606 may enable its user to communicate with other users at other client systems 606.

In particular embodiments, client system 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 606 may enter a Uniform Resource Locator (URL) or other address directing the web browser to a particular server (such as server, or a server associated with a third-party system 608), and the web browser may generate a Hyper Text Transfer Protocol (HTTP) request and communicate the HTTP request to server. The server may accept the HTTP request and communicate to client system 606 one or more Hyper Text Markup Language (HTML) files responsive to the HTTP request. Client system 606 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 602 may be a network-addressable computing system that can host an online social network. Social networking system 602 may generate, store, receive, and send social-networking data, such as, for example, user-profile data, concept-profile data, social-graph information, or other suitable data related to the online social network. Social networking system 602 may be accessed by the other components of network environment 600 either directly or via network 604. In particular embodiments, social networking system 602 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 602 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 606, a social networking system 602, or a third-party system 608 to manage, retrieve, modify, add, or delete, the information stored in data store.

In particular embodiments, social networking system 602 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 602 may provide users of the online social network the ability to communicate and interact with other users. In particular embodiments, users may join the online social network via social networking system 602 and then add connections (e.g., relationships) to a number of other users of social networking system 602 whom they want to be connected to. Herein, the term "friend" may refer to any other user of social networking system 602 with whom a user has formed a connection, association, or relationship via social networking system 602.

In particular embodiments, social networking system 602 may provide users with the ability to take actions on various types of items or objects, supported by social networking system 602. As an example and not by way of limitation, the items and objects may include groups or social networks to which users of social networking system 602 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 602 or by an external system of third-party system 608, which is separate from social networking system 602 and coupled to social networking system 602 via a network 604.

In particular embodiments, social networking system 602 may be capable of linking a variety of entities. As an example and not by way of limitation, social networking system 602 may enable users to interact with each other as well as receive content from third-party systems 608 or other entities, or to allow users to interact with these entities through an application programming interfaces (API) or other communication channels.

In particular embodiments, a third-party system 608 may include one or more types of servers, one or more data stores, one or more interfaces, including but not limited to APIs, one or more web services, one or more content sources, one or more networks, or any other suitable components, e.g., that servers may communicate with. A third-party system 608 may be operated by a different entity from an entity operating social networking system 602. In particular embodiments, however, social networking system 602 and third-party systems 608 may operate in conjunction with each other to provide social-networking services to users of social networking system 602 or third-party systems 608. In this sense, social networking system 602 may provide a platform, or backbone, which other systems, such as third-party systems 608, may use to provide social-networking services and functionality to users across the Internet.

In particular embodiments, a third-party system 608 may include a third-party content object provider. A third-party content object provider may include one or more sources of content objects, which may be communicated to a client system 606. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 602 also includes user-generated content objects, which may enhance a user's interactions with social networking system 602. User-generated content may include anything a user can add, upload, send, or "post" to social networking system 602. As an example and not by way of limitation, a user communicates posts to social networking system 602 from a client system 606. Posts may include data such as status updates or other textual data, location information, photos, videos, links, music or other similar data or media. Content may also be added to social networking system 602 by a third-party through a "communication channel," such as a newsfeed or stream.

In particular embodiments, social networking system 602 may include a variety of servers, sub-systems, programs, modules, logs, and data stores. In particular embodiments, social networking system 602 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 602 may also include suitable components such as network interfaces, security mechanisms, load balancers, failover servers, management-and-network-operations consoles, other suitable components, or any suitable combination thereof. In particular embodiments, social networking system 602 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 602 to one or more client systems 606 or one or more third-party system 608 via network 604. The web server may include a mail server or other messaging functionality for receiving and routing messages between social networking system 602 and one or more client systems 606. An API-request server may allow a third-party system 608 to access information from social networking system 602 by calling one or more APIs. An action logger may be used to receive communications from a web server about a user's actions on or off social networking system 602. In conjunction with the action log, a third-party-content-object log may be maintained of user exposures to third-party-content objects. A notification controller may provide information regarding content objects to a client system 606. Information may be pushed to a client system 606 as notifications, or information may be pulled from client system 606 responsive to a request received from client system 606. Authorization servers may be used to enforce one or more privacy settings of the users of social networking system 602. A privacy setting of a user determines how particular information associated with a user can be shared. The authorization server may allow users to opt in to or opt out of having their actions logged by social networking system 602 or shared with other systems (e.g., third-party system 608), such as, for example, by setting appropriate privacy settings. Third-party-content-object stores may be used to store content objects received from third parties, such as a third-party system 608. Location stores may be used for storing location information received from client systems 606 associated with users. Advertisement-pricing modules may combine social information, the current time, location information, or other suitable information to provide relevant advertisements, in the form of notifications, to a user.

Figure 7:
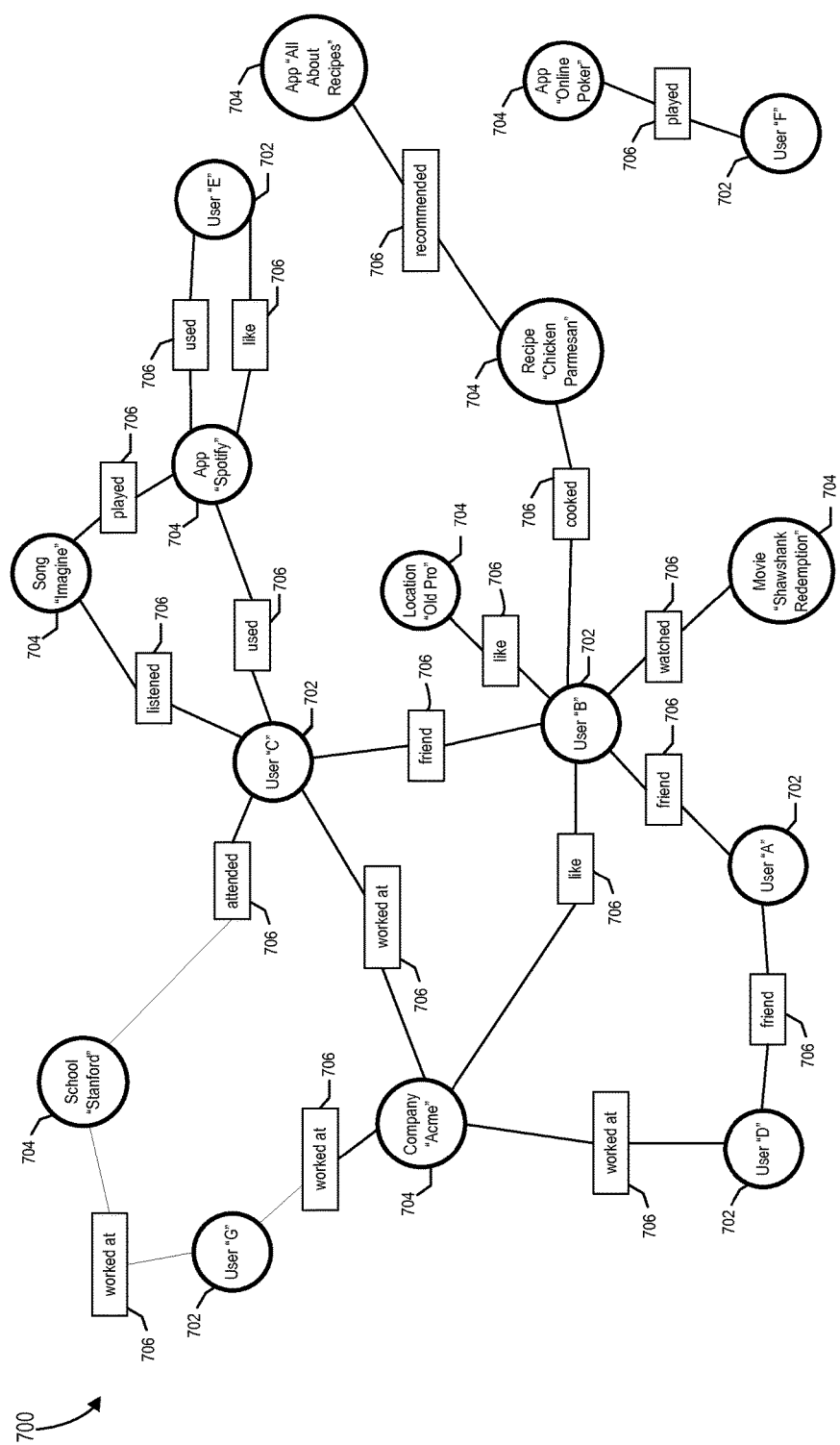
FIG. 7 illustrates a social graph in accordance with one or more embodiments.

FIG. 7 illustrates example social graph 700. In particular embodiments, social networking system 602 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social networking system 602, client system 606, or third-party system 608 may access social graph 700 and related social-graph information for suitable applications. The nodes and edges of social graph 700 may be stored as data objects, for example, in a data store (such as a social-graph database). Such a data store may include one or more searchable or query able indexes of nodes or edges of social graph 700.

In particular embodiments, a user node 702 may correspond to a user of social networking system 602. As an example and not by way of limitation, a user may be an individual (human user), an entity (e.g., an enterprise, business, or third-party application), or a group (e.g., of individuals or entities) that interacts or communicates with or over social networking system 602. In particular embodiments, when a user registers for an account with social networking system 602, social networking system 602 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social networking system 702. In particular embodiments, a user node 702 may be associated with information provided by a user or information gathered by various systems, including social networking system 702. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 602 or a third-party website associated with a web-application server); an entity (such as, for example, a person, business, group, sports team, or celebrity); a resource (such as, for example, an audio file, video file, digital photo, text file, structured document, or application) which may be located within social networking system 602 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including social networking system 602. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social networking system 602. Profile pages may also be hosted on third-party websites associated with a third-party server 608. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 608. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 706 to send to social networking system 702 a message indicating the user's action. In response to the message, social networking system 702 may create an edge (e.g., an "eat" edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social networking system 602 may send a "friend request" to the second user. If the second user confirms the "friend request," social networking system 602 may create an edge 706 connecting the first user's user node 702 to the second user's user node 702 in social graph 700 and store edge 706 as social-graph information in one or more of data stores. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social networking system 602 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social networking system 602 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social networking system 602 may create an edge 706 between a user node 702 and a concept node 704 in social graph 700. As an example and not by way of limitation, a user viewing a concept-profile page (such as, for example, by using a web browser or a special-purpose application hosted by the user's client system 606) may indicate that he or she likes the concept represented by the concept node 704 by clicking or selecting a "Like" icon, which may cause the user's client system 606 to send to social networking system 602 a message indicating the user's liking of the concept associated with the concept-profile page. In response to the message, social networking system 602 may create an edge 706 between user node 702 associated with the user and concept node 704, as illustrated by "like" edge 706 between the user and concept node 704. In particular embodiments, social networking system 602 may store an edge 706 in one or more data stores. In particular embodiments, an edge 706 may be automatically formed by social networking system 602 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition or as an alternative, an advertisement may include social-networking-system context directed to the user. As an example and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example and not by way of limitation, if a user may make frequently posts content related to "coffee" or variants thereof, social networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 602 may calculate a coefficient based on the type of relationship between particular objects. Referencing the social graph 700, social networking system 602 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 602 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 706 of the user). A first user may be more interested in other users or concepts that are closer to the first user. As an example and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 602 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 608 (e.g., via an API or other communication channel), or from another suitable system. In response to the request, social networking system 602 may calculate the coefficient (or access the coefficient information if it has previously been calculated and stored). In particular embodiments, social networking system 602 may measure an affinity with respect to a particular process. Different processes (both internal and external to the online social network) may request a coefficient for a particular object or set of objects. Social networking system 602 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client system 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   identifying, within a social graph maintained by a social networking system and using one or more processors, a user-to-user sale listing available on the social networking system, wherein the sale listing advertises an item for sale by a seller and is associated within the social graph with social networking activity information and item information, wherein the social networking activity information comprises comments and messages associated with the sale listing and the item information comprises a product-type associated with the sale listing;
   analyzing, using the one or more processors, the comments and messages associated with the sale listing;
   analyzing, using the one or more processors, the product-type associated with the sale listing;
   determining, using the one or more processors and based on the analyzed comments and messages associated with the sale listing and on the analyzed product-type associated with the sale listing, a likelihood that the item advertised for sale in the sale listing available on the social networking system has been sold offline;
   receiving, using the one or more processors and in response to a prompt provided to the seller based on the determined likelihood, an indication from the seller to update the sale listing to indicate the item has been sold offline; and
   updating the sale listing within the social graph to indicate the item is no longer for sale.

2. The method as recited in claim 1, wherein the user-to-user sale listing is available on the social networking system via a for-sale group.

3. The method as recited in claim 1, further comprising analyzing additional item information associated with the sale listing, wherein analyzing the additional item information comprises analyzing one or more of a description of the item, a typical price associated with the product-type, a history of similar sales associated with the product-type, a history of sales associated with the product-type within a geographic region, a typical length of time associated with sales of items of the product-type associated with the item, or an advertising saturation level associated with the product-type.

4. The method as recited in claim 3, further comprising analyzing additional social networking activity information associated with the sale listing, wherein analyzing the additional social networking activity information comprises analyzing one or more of a social networking system association between the seller and a sender of a comment, a period of time that has elapsed since the seller submitted the sale listing, a typical period of time that elapses before similar items are sold, or a volume of sales associated with other items similar to the item for sale by the seller via the social networking system.

5. The method as recited in claim 4, further comprising determining a weight associated with each piece of item information associated with the sale listing and each piece of social networking activity information associated with the sale listing.

6. The method as recited in claim 5, wherein
   the analysis of item information associated with the sale listing indicates whether the sale listing has been active for an amount of time that is longer than a typical length of time for sale listings of similar items, and
   if the sale listing has been active for an amount of time longer than the typical length of time for sale listings of similar items, the determined likelihood that the item has been sold is increased.

7. The method as recited in claim 5, wherein
   the analysis of the comments and messages associated with the sale listing comprises a natural language processing analysis of the comments and messages associated with the sale listing to identify whether the comments and messages associated with the sale listing include language indicating an off-line sale of the item has taken place, and if the comments and messages associated with the sale listing include language indicating an off-line sale of the item has taken place, the determined likelihood that the item has been sold is increased.

8. The method as recited in claim 1, wherein:
determining a likelihood that the item has been sold offline further comprises calculating a score based on the analyzed comments and messages associated with the sale listing and the analyzed product-type associated with the sale listing; and
further comprising, prior to receiving an indication from the seller to update the sale listing, prompting the seller to update the sale listing to indicate the item has been sold based on the calculated score.

9. The method as recited in claim 8, wherein prompting the seller to update the sale listing to indicate the item has been sold comprises one or more of providing the seller with a mark as sold notification or providing the seller with a mark as sold control.

10. The method as recited in claim 9, further comprising:
receiving, in response to being prompted, a selection of the mark as sold control;
wherein updating the sale listing to indicate the item is no longer for sale comprises updating a node associated with the sale listing within the social graph.

11. A system comprising:
at least one processor; and
at least one non-transitory computer-readable storage medium storing instructions thereon that, when executed by the at least one processor, cause the system to:
identify, within a social graph maintained by a social networking system, a user-to-user sale listing available on the social networking system, wherein the sale listing advertises an item for sale by a seller and is associated within the social graph with social networking activity information and item information, wherein the social networking activity information comprises comments and messages associated with the sale listing and the item information comprises a product-type associated with the sale listing;
analyze the comments and messages associated with the sale listing;
analyze the product-type associated with the sale listing;
determine, based on the analyzed comments and messages associated with the sale listing and on the analyzed product-type associated with the sale listing, a likelihood that the item advertised for sale in the sale listing available on the social networking system has been sold offline;
receive, in response to a prompt provided to the seller based on the determined likelihood, an indication from the seller to update the sale listing to indicate the item has been sold offline; and
update the sale listing within the social graph to indicate the item is no longer for sale.

12. The system as recited in claim 11, wherein the user-to-user sale listing is available on the social networking system via a for-sale group.

13. The system as recited in claim 12, further storing instructions that, when executed by the at least one processor, cause the system to analyze item information associated with the sale listing by analyzing one or more of a description of the item, product-type associated with the item, a typical price associated with the product-type, a history of similar sales associated with the product-type, a history of sales associated with the product-type within a geographic region, a typical length of time associated with sales of items of the product-type associated with the item, or an advertising saturation level associated with the product-type.

14. The system as recited in claim 13, further storing instructions that, when executed by the at least one processor, cause the system to analyze social networking activity information associated with the sale listing by analyzing one or more of a social networking system association between the seller and a sender of a comment, a period of time that has elapsed since the seller submitted the sale listing, a typical period of time that elapses before similar items are sold, or a volume of sales associated with other items similar to the item for sale by the seller via the social networking system.

15. The system as recited in claim 14, further comprising instructions that, when executed by the at least one processor, cause the system to determine a weight associated with each piece of item information associated with the sale listing and each piece of social networking activity information associated with the sale listing.

16. The system as recited in claim 15, wherein
the analysis of item information associated with the sale listing indicates whether the sale listing has been active for an amount of time that is longer than a typical length of time for sale listings of similar items, and
if the sale listing has been active for an amount of time longer than the typical length of time for sale listings of similar items, the determined likelihood that the item has been sold is increased.

17. The system as recited in claim 16, wherein
the analysis of the comments and messages associated with the sale listing comprises a natural language processing analysis of the comments and messages associated with the sale listing to identify whether the comments and messages associated with the sale listing include language indicating an off-line sale of the item has taken place, and
if the comments and messages associated with the sale listing include language indicating an off-line sale of the item has taken place, the determined likelihood that the item has been sold is increased.

18. The system as recited in claim 17, further comprising instructions that, when executed by the at least one processor, cause the system to:
calculate a score based on the analyzed social networking activity information associated with the sale listing and the analyzed item information associated with the sale listing;
prompt the seller to update the sale listing to indicate the item has been sold based on the calculated score, wherein prompting the seller to update the sale listing comprises one or more of providing the seller with a mark as sold notification or providing the seller with a mark as sold control.

19. The system as recited in claim 18, further comprising instructions that, when executed by the at least one processor, cause the system to:
receive, in response to being prompted, a selection of the mark as sold control;

wherein updating the sale listing within the social graph to indicate the item is no longer for sale comprises updating a node associated with the sale listing within the social graph.

20. A non-transitory computer readable medium storing instructions thereon that, when executed by at least one processor, cause a computer system to:

identify, within a social graph maintained by a social networking system using one or more processors, a user-to-user sale listing available on the social networking system, wherein the sale listing advertises an item for sale by a seller and is associated within the social graph with social networking activity information and item information, wherein the social networking activity information comprises comments and messages associated with the sale listing and the item information comprises a product-type associated with the sale listing;

analyze, using the one or more processors, the comments and messages associated with the sale listing;

analyze the product-type associated with the sale listing;

determine, using the one or more processors and based on the analyzed comments and messages associated with the sale listing and on the analyzed product-type associated with the sale listing, a likelihood that the item advertised for sale in the sale listing available on the social networking system has been sold offline;

receive, using the one or more processors and in response to a prompt provided to the seller based on the determined likelihood, an indication from the seller to update the sale listing to indicate the item has been sold offline; and update the sale listing within the social graph to indicate the item is no longer for sale.

\* \* \* \* \*